United States Patent [19]

Bahr et al.

[11] Patent Number: 4,483,902

[45] Date of Patent: Nov. 20, 1984

[54] RECORD CARRIER

[75] Inventors: Dietrich J. Bahr, Herrenberg; Marian Briska, Boeblingen, both of Fed. Rep. of Germany

[73] Assignee: International Business Machines Corporation, Armonk, N.Y.

[21] Appl. No.: 202,547

[22] Filed: Oct. 31, 1980

[30] Foreign Application Priority Data

Feb. 27, 1980 [DE] Fed. Rep. of Germany ....... 3007330

[51] Int. Cl.[3] ........................ G01D 15/34; B32B 5/16; B32B 29/04

[52] U.S. Cl. ................................ 428/330; 346/135.1; 428/340; 428/464; 428/535; 428/536; 428/913

[58] Field of Search ............... 428/464, 535, 536, 913, 428/330, 340; 346/135.1

[56] References Cited

U.S. PATENT DOCUMENTS

| | | | |
|---|---|---|---|
| 2,833,677 | 5/1968 | Baumlein | 428/464 |
| 3,441,940 | 4/1969 | Salaman | 346/135.1 |
| 3,786,518 | 1/1974 | Atherton | 346/135.1 |
| 4,241,356 | 12/1980 | Brill | 346/135.1 |

*Primary Examiner*—Ellis P. Robinson
*Attorney, Agent, or Firm*—Joseph G. Walsh

[57] ABSTRACT

A record carrier is formed with a substrate, a lacquer layer, and a metallic layer, with the lacquer layer containing from 0.5 to 5 percent by weight of fine particles of calcium carbonate.

6 Claims, No Drawings

RECORD CARRIER

DESCRIPTION

1. Technical Field

The invention concerns a record carrier coated with a lacquer layer containing a contrast medium and a metallic layer preferably consisting of or containing aluminum.

2. Prior Art

For printing on aluminum-coated paper, as well as on paper or plastic foils provided with another metallic coating, the print electrodes have to be in permanent contact with the metallic layer, i.e., they constantly grind against the record carrier. Although it is possible to use other metallic coatings, the difficulties encountered so far and the solutions provided by the invention will be described in principle by way of an aluminum-coated record carrier. As the electrodes, when grinding against the record carrier, erode the aluminum in the direction of printing mainly with their front edges, they slide on the subjacent, mostly dark or black colored, lacquer layer and to the formation of vapors. These vapors are deposited, i.e., they condense, on the generally dusty print residues around the electrodes, forming as time goes by, a tough to hard cake which when it surrounds the electrodes completely no longer permits printing. Whether and how rapidly such a cake is formed depends, for example, upon the print frequency, i.e., the number of characters actually printed.

One possibility of reducing or eliminating this rather detrimental phenomenon is to use lacquers which are resistant to higher temperatures. So far, however, such an approach has not been entirely successful, since the temperatures occurring at the electrodes tips exceed 1000° C.

It would be conceivable, for example to admix pigments to the lacquer, which are resistant to high temperatures and the particles of which exceed the thickness of the dry lacquer layer, so that they partly protrude from the lacquer. If their density is chosen sufficiently high, the electrodes will slide only on the pigment tips, without or rarely touching the lacquer. Such pigment admixtures are known from the art, but the materials selected were either so hard, as, for example, silicon dioxide, that the electrode wear became excessive, or their structure, such as that of amorphous $SiO_2$: diatomaceous earth, was so delicate that after the electrodes had passed them only once, their wear characteristics had changed drastically. As a result, electrodes operating in the overlap mode were subject to non-uniform wear over their diameter, so that their full surface was no longer available for printing. In comparison with pure carbon pigmentation, diatomaceous earth has an up to 10 times higher wear.

DISCLOSURE OF THE INVENTION

It is the object of the invention to provide a record carrier as described above which is such that tough and hard residues are reliably avoided. In accordance with the invention, this is achieved by pigmenting the lacquer layer at a rate of 0.5 to 5 percent by weight with finely distributed, fine particle calcium carbonate ($CaCO_3$) having a particle size ranging from about 2 to about 10 μm. For this purpose, precipitated calcium carbonate with a dense particle size distribution is preferably used. It is particularly advantageous to use a heat-resistant lacquer in conjunction with the calcium carbonate ($CaCO_3$). A cellulose acetate ester can be used to advantage as a heat-resistant lacquer. Particularly advantageous is a lacquer containing cellulose acetate butyrate.

As calcium carbonate is white or colorless by nature, a further development of the invention provides for the calcium carbonate to be dyed for increased contrast. The color of the calcium carbonate is preferably adapted to that of the lacquer, i.e., in the case of a carboniferous lacquer layer, the calcium carbonate is dyed dark. This dark color can be obtained, for example, by the diffusion of heavy-metals. It is particularly advantageous to dye the calcium carbonate by precipitating it together with a colored heavy-metal ion, such as iron carbonates containing color cations or $Mn^{4+}$. For this purpose, it is essential that the calcium carbonate is produced with a predetermined dense particle size distribution prior to being admixed to the lacquer.

Although, in principle, plastic foils are suitable as substrates, paper substrates are particularly advantageous in the case described.

As a result, a metallized record recarrier material is obtained which comprises a substrate, a dark lacquer layer and a metallic top layer preferably containing aluminum, and which, in accordance with the invention, is characterized in that the lacquer layer consists of a heat-resistant lacquer containing about 0.5 to 5 percent by weight of finely distributed, fine particle calcium carbonate with a particle size ranging from about 2 μm to about 10 μm, the lacquer layer preferably containing about 2000 to 5000 $CaCO_3$ particles per $mm^2$ and the finely distributed, fine particle calcium carbonate material being dyed dark.

This new record carrier offers extraordinary advantages. The heat-resistant lacquer, which could be a cellulose acetate ester, but which preferably takes the form of a lacquer essentially consisting of cellulose acetate butyrate with a carbon pigment, is prepared as follows. The calcium carbon can be produced with the required dense particle size distribution ranging from about 2 μm to about 10 μm prior to precipitation. This eliminates a grinding process which would also supply particle sizes of less than 2 μm. After the lacquer constituents have been prepared on their own, a solvent and a binder are added in the usual manner. Then the calcium carbonate is added to this liquid lacquer. As calcium carbonate is white, it must be dyed for increased contrast. If carboniferous lacquers are used, the calcium carbonate should be dyed dark. This is preferably done by the diffusion of heavy-metals but can also be effected to particular advantage by precipitating the calcium carbonate together with colored heavy-metal ions. Unlike most other materials, calcium carbonate, if precipitated, can be produced with an accurately defined particle size. The proposed dyeing scarcely affects the particle size distribution.

A dense particle size distribution is important, as small particles as such are ineffective, because, apart from consuming the space required for the carbon acting as a contrast medium, they only fill the lacquer without protruding from the lacquer surface. If the particles are too large, the distance between the electrodes and the aluminum surface becomes too great, thus rendering the print process unnecessarily difficult.

A heat-resistant lacquer, such as a cellulose acetate butyrate lacquer, is necessary to prevent the pigments from becoming detached from the lacquer film and moving freely between the front faces of the electrodes and the paper surface, thus causing the electrodes to move as on spheres and seriously interfering with the print process. This means, for example, that nitrocellulose as a lacquer film is utterly unsuitable.

Upon touching the electrodes, the calcium carbonate at the hot electrode tips decomposes on the surface to calcium oxide and carbon dioxide $CaCO_3 \rightarrow CaO + CO_2$. In addition, calcium carbide $CaC_2$ is formed in the arc at the electrode tip. Both materials belong to the most hygroscopic materials there are. They immediately bind the water freed during the decomposition of nitrates and acetates, thus acting as a desiccant keeping all residues between the electrodes dry, so that caking is eliminated.

In addition, calcium carbonate is soft and thus has few sharp edges, so that the electrode wear is only about twice as high as that encountered with pure carbon pigmentation. Calcium carbonate is, however, sufficiently hard to prevent pigment particles from being destroyed by the electrodes. Calcium carbonate is extremely cheap and can be readily added to the lacquer.

The record carriers of the present invention, even with very fine electrode tips and at high print speeds, completely eliminate the caking of dusty residues previously encountered.

We claim:

1. A record carrier comprising a substrate, a lacquer layer and a metallic layer, characterized in that the lacquer layer comprises a heat-resistant lacquer containing about 0.5 to 5 percent by weight of finely distributed, fine particle calcium carbonate having a particle size ranging from about 2 $\mu m$ to 10 $\mu m$.

2. A record carrier as claimed in claim 1, wherein the lacquer layer contains about 2000 to 5000 $CaCO_3$ particles per $mm^2$.

3. A record carrier as claimed in claim 1, wherein the finely distributed fine particle calcium carbonate material is dyed dark.

4. A record carrier as claimed in claim 1 wherein the metallic layer comprises aluminum.

5. A record carrier as claimed in claim 1 wherein the substrate is paper.

6. A record carrier comprising a paper substrate, a lacquer layer and a top layer of aluminum characterized in that the lacquer layer comprises cellulose acetate butyrate containing about 0.5 to 5 percent by weight of finely distributed, fine particle, dark dyed calcium carbonate having a particle size ranging from about 2 $\mu m$ to 10 $\mu m$.

* * * * *